(12) United States Patent
Singh (10) Patent No.: US 9,107,434 B2
(45) Date of Patent: Aug. 18, 2015

(54) METHOD AND APPARATUS FOR PLASMA ASSISTED LASER COOKING OF FOOD PRODUCTS

(76) Inventor: Inderjit Singh, Singapore (SG)

( * ) Notice: Subject to any disclaimer, the term of this patent is extended or adjusted under 35 U.S.C. 154(b) by 0 days.

(21) Appl. No.: 14/004,290

(22) PCT Filed: Mar. 11, 2011

(86) PCT No.: PCT/SG2011/000099
§ 371 (c)(1),
(2), (4) Date: Sep. 10, 2013

(87) PCT Pub. No.: WO2012/125118
PCT Pub. Date: Sep. 20, 2012

(65) Prior Publication Data
US 2013/0344208 A1     Dec. 26, 2013

(51) Int. Cl.
| A23L 1/01 | (2006.01) |
| A23L 1/025 | (2006.01) |
| H05B 6/64 | (2006.01) |
| F24C 7/08 | (2006.01) |

(52) U.S. Cl.
CPC .............. *A23L 1/0128* (2013.01); *A23L 1/0252* (2013.01); *F24C 7/087* (2013.01); *H05B 6/647* (2013.01)

(58) Field of Classification Search
CPC ................... A23L 1/01; A23L 1/0128; A23L 1/025–1/0257; A23B 4/015; A23B 5/015; A23B 7/015; A23B 9/06
USPC ................. 426/234–237, 241–243, 248, 523, 426/231–233
See application file for complete search history.

(56) References Cited

U.S. PATENT DOCUMENTS

| 6,299,920 | B1 * | 10/2001 | Saksena | 426/231 |
| 7,682,641 | B1 * | 3/2010 | Vasilenko | 426/237 |
| 2004/0091588 | A1 * | 5/2004 | Li | 426/248 |
| 2004/0118816 | A1 * | 6/2004 | Kumar et al. | 219/121.59 |
| 2008/0124433 | A1 * | 5/2008 | Yelden et al. | 426/233 |
| 2008/0282901 | A1 * | 11/2008 | Muchnik | 99/325 |
| 2009/0014441 | A1 * | 1/2009 | Tasch et al. | 219/679 |
| 2009/0229640 | A1 * | 9/2009 | Shim et al. | 134/104.1 |
| 2010/0007492 | A1 * | 1/2010 | Ressler et al. | 340/540 |
| 2010/0015313 | A1 * | 1/2010 | Harris | 426/523 |
| 2010/0183779 | A1 * | 7/2010 | Felix | 426/231 |
| 2011/0014330 | A1 * | 1/2011 | Meyers et al. | 426/236 |
| 2011/0027432 | A1 * | 2/2011 | Loeser | 426/248 |

FOREIGN PATENT DOCUMENTS

| EP | 1 498 212 A1 | 1/2005 |
| JP | 2002 147762 A | 5/2002 |
| WO | 2006102552 A1 | 9/2006 |
| WO | 2006/138701 A2 | 12/2006 |
| WO | 2010130567 A2 | 11/2010 |
| WO | 2011017617 A1 | 2/2011 |

OTHER PUBLICATIONS

Supplementary European Search Report issued for European Application No. 11861134.2 dated Aug. 8, 2014, 7 pages.

* cited by examiner

*Primary Examiner* — Drew Becker
(74) *Attorney, Agent, or Firm* — Rothwell, Figg, Ernst & Manbeck, p.c.

(57) ABSTRACT

A method and apparatus are disclosed for applying laser energy to a food product to effect cooking thereof. The energy can be applied with a laser emitter in proximity to the food product. The application of the energy can be controlled according to a profile so as to generate a plasma in and around the food product during a cooking period. The application of energy can be adjusted based on feedback associated with the controlled application of the energy to the food product.

18 Claims, 5 Drawing Sheets

METHOD AND APPARATUS FOR PLASMA ASSISTED LASER COOKING OF FOOD PRODUCTS

CROSS REFERENCE TO RELATED APPLICATION(S)

This application is a 35 U.S.C. §371 National Phase Entry Application from PCT/SG2011/000099, filed Mar. 11, 2011, designating the United States. The disclosure of the referenced application is incorporated herein in its entirety by reference.

FIELD OF THE INVENTION

The present disclosure relates generally to the use of lasers in heating and cooking of food products. More specifically, the present disclosure is directed to the generation of a plasma in connection with a laser for cooking food products using a variety of laser types of different wavelengths having continuous and pulsed mode operation.

BACKGROUND

Increasingly rapid advances in laser technology along with increasingly wide scale deployment have made the deployment of laser technology to a wider variety of applications possible. The potential advantages of laser technology in terms of input to output energy efficiency coupled with engineering and economic considerations such as controllability, cost, and supplier availability has led to continuously stimulated growth in the development of numerous devices and processes to exploit the full benefits of laser technology.

Concentrated growth in the application of laser technology has been seen over the last several decades particularly in the area of optoelectronics, which, for example, makes use of semiconductor lasers for communications. However, the application of lasers beyond communications is also rapidly increasing. It is becoming increasingly common for lasers to be used as the preferred tool for numerous industrial applications such welding, soldering, marking, metal cutting, entertainment electronics, display devices, printing and the like. It is beyond dispute that laser applications, which are, by now, quite well established, have revolutionized modern day living.

However, despite the widespread use of lasers for numerous applications, as set forth above, certain areas have not seen widespread use of laser technology. For example, the potential of lasers has not been exploited in connection with domestic and commercial food preparation. In another area, food preparation technology has also taken many leaps forward. The microwave oven and various convection systems are widely available and shorten food preparation time for heating and cooking food. Yet despite advances in radiant and radio energy heating appliances, there are presently no laser-based cooking appliances available for domestic or commercial use. While conventional cooking methods including gas energy, electrical energy, and microwave irradiant energy have unique limitations, including energy cost, fire hazard, radiation hazard, which has not impeded their widespread use, heating food products using lasers has not seen any development due to various problems some of which are recognized in the art and some of which are not. Thus, while lasers are extensively used in many applications as noted above, their potential for heating food products has not been explored.

Various impediments to the development of a laser cooking appliance may include the difficulty in determining the appropriate parameters for laser cooking, the problems with the process implementation due to delicate nature of the food product materials, and the like. It may be difficult to easily initiate cooking of food products and, if cooking can be initiated, it is difficult to assure quality and uniformity of the heating or cooking process. Consequently, laser cooking of food for consumer application has not been successfully achieved.

While published research work in the area of laser cooking is quite limited and while no appliance is commercially available, the feasibility of laser cooking has improved considerably, particularly with the availability of several types of reliable laser units operating at variety of wavelengths and power levels. Despite the improved feasibility, there is still no progress in providing a laser cooking appliance.

Despite the numerous potential advantages of laser devices such as (i) the delivery of intense energy over prescribed area leading to localized heating, (ii) the uniformity, repeatability and precise control of the energy delivered, (iii) the ability to program and deliver the energy in short bursts in terms of power, pulse width, pulse repetition rate and other parameters, (iv) the lack of contact and contamination of the heated object, lasers have not been successfully used in cooking, (v) the lack of an open flame or arc, and (vi) low cost, no appliance has yet been developed.

It should be noted, particularly in connection with item (vi), that with the tremendous growth in the availability of laser devices and the implementation of mass production techniques, the cost of the laser will trend downward over time. Thus, a laser-based cooking device could be developed that would see a decreasing cost structure for its primary element. On the other hand, it is unlikely that significant cost reductions for conventional cooking appliances are possible due to the maturity of the product line. However, such advantageous conditions have not as yet been appreciated in the art by those of corresponding skill.

In addressing the lack of a laser cooking appliance, reference is made to certain problems associated with cooking of food material with a laser. Such problems are considerably more complex than may be apparent at a first glance. Extensive studies, both empirical/experimental and theoretical, are necessary in order to characterize the laser cooking parameters and determine their effects on the food product and the resulting quality of the cooked food product. Such studies and relevant data, which are of great importance for process optimization, however are not available.

As noted the use of lasers in industrial applications is known, however lasers had not been widely contemplated for food preparation and cooking due to the inherent challenges in manipulating even simple regularly structured materials such as glasses and crystalline materials. For example, in "Development of a system for laser splicing photonic crystal fiber", Chong and Rao, Col. 11, No. 12, OPTICS EXPRESS 1365, 16 Jun. 2003, describes laser splicing by fusing materials through the application of laser energy. While some benefits were observed due, presumably, to various effects of repeated and continued application of laser energy, the specific purpose was to fuse fiber optic devices such as regularly arranged polycrystalline materials under very limited conditions.

While some attempts were made to employ lasers for cooking applications, none has resulted in a successful laser cooking appliance. For example, Japanese Patent Publication No. JP 63-003131 A2, to Terakubo Kiyoshi, published in January 1988, describes a Laser Cooking Device that completely stops the generation of poisonous gases and improves cooking efficiency. In Terakubo's device, advantages are realized by cooking food indirectly in a cooker heated by a laser. In Terakubo's device, food is not directly exposed to the laser beam.

Further, U.S. Pat. No. 5,881,634 issued to Robert K. Newton, on Mar. 16, 1999, describes a clamshell or two-sided cooking system having two platens or plates used to cook food. In Newton's system, the periphery of an upper platen is marked on a lower platen by a laser-etched wear resistant marking that withstands the scraping and scrubbing operations associated with using and cleaning the clam cooking system. The device described by Newton, does not use a laser to cook food, and provides wear resistant markings in the clamshell cooking system.

Still further, U.S. Pat. No. 5,952,027 issued to Prem S. Singh on Sep. 14, 1999 describes a using an energy source, which can be a laser, to brown an exposed surface of a pre-cooked muscle meat product. Singh's method involves only the surface of the product and requires various chemicals to assist in creating a golden brown effect on only the surface portion of the meat product.

In Japanese Patent No. JP 2002-147762 A2 published May 22, 2002, to Asano Hideki, a Food Cooking Apparatus is described that includes a microwave oven with a laser irradiation unit that irradiates a laser beam at a specific wavelength through an optical fiber onto foodstuffs in a cooking chamber. Two kinds of semiconductor lasers having different wavelengths of 0.8 μm and 1.5 μm are coupled to the respective optical fibers. The machine room is provided with a magnetron, a waveguide, and a fan to discharge heat generated. The device described in Asano has disadvantages in that it is very complex and expensive. It is not clear whether the food is cooked by microwave or laser beam. It also requires a waveform for control the cooking process.

In U.S. Patent Application Publication No. 2008/0282901, to Boris Muchnik, a method and apparatus are introduced for using a laser to cook food. A CO2 laser is directed at a beam splitter which splits the laser beam in half. Mirrors are used to focus beams to either side of the food. The CO2 laser beams are much hotter than average and as such most foods will be cooked in less than a second. Further, by cooking food at such high speeds the juices will be sealed in and the formation of trans-fats will be reduced or prevented.

SUMMARY

Therefore, in view of the above and other disadvantages and shortcomings of the prior art and knowledge commonly available, cooking of a food product can be effected through the use of lasers as previously unappreciated.

In accordance with an aspect, energy can be applied, for example, from a laser emitter, to effect cooking of a positioned food product. The application of the energy from the laser emitter can be controlled according to a profile so as to generate a plasma during a cooking period. The application of the energy from the laser emitter can be adjusted during the cooking period based on feedback associated with the controlled application of the energy to the food product. The food product can be positioned within a container and the laser energy can be applied to at least a portion of the container to generate a plasma in and around the container to effect the cooking, such as through heat conduction or convection based on the heating of the container.

In an aspect, energy can be applied with a laser emitter applied in proximity to a positioned food product to effect cooking thereof. The application of the energy from the laser emitter onto the food product can be controlled according to a profile so as to generate a plasma in and around at least a portion of the food product during a cooking period. The application of the energy from the laser emitter during the cooking period based on feedback associated with the controlled application of the energy to the food product. The profile can include a power level, a duration of the cooking period, and a pulse duty cycle. The controlling of the application of the energy can be accomplished, for example, by controlling a spot size of the laser beam or other factors as described herein. The adjusting the application of the energy can include controlling a position of the food product in relation to the laser emitter.

In accordance with aspects, the laser emitter can include an Nd:YAG laser, a CO2 laser, an Excimer laser, a diode laser, and the like. Further, the profile can include a peak power of about 0.3 kW, an average power of about 1.9 W, a pulse width of about loons, a pulse frequency of about 3 kHz, and a duration of the cooking period of about 60 s. In an instance where the laser emitter includes a laser diode, the profile can include a peak power of about 0.3 kW, an average power of about 1 W, a pulse width of about 50 ns, a pulse frequency of about 3 kHz, and a duration of the cooking period of about 60 s. Alternatively, the profile includes a peak power of about 0.3 kW, an average power of about 1.6 W, a pulse width of about 50 ns, a pulse frequency of about 4 kHz, and a duration of the cooking period of about 60 s.

In accordance with aspects, the application of energy during the cooking period is further based on a specific type of the food product. It should be noted that the profile, including profiles for different foods products can be stored locally or can be retrieved, for example, from a host computer or from a server connected to the host computer through a network.

BRIEF DESCRIPTION OF THE DRAWINGS

In order that embodiments may be fully and more clearly understood by way of non-limitative examples, the following description is taken in conjunction with the accompanying drawings in which like reference numerals designate similar or corresponding elements, regions and portions, and in which.

DETAILED DESCRIPTION

In view of the above and other disadvantages associated with prior art systems, cooking with lasers as set forth in accordance with various exemplary embodiments discussed and described herein, presents a new and unique opportunity, previously not appreciated in the art. Using lasers, it is possible to perform, for example, direct cooking, indirect cooking through a metal plate, and vegetable peeling may be possible without any additional accessories. An advantage of, for example, cooking using laser energy is the lack of an electrical shock hazard. Cooking of commonly used domestic food materials rapidly and with high efficiency will be possible. Cooking of food with precise control over the heat source will minimize damage of the food. Cooking of food with low power consumption will be possible. Cooking of food in the field using a portable laser cooking appliance will be possible. Indirect cooking by using laser to heat a plate which can be used for cooking food is possible. Combining laser cooking and other methods, such as microwave and conventional heating will be possible.

As observed by Chong and Rao, controlled exposure to laser energy can have a desired heating effect on regularly arranged materials such as photonic crystal fiber (PCF) according to the following relation (1).

$$V_{\textit{eff}} = (2\pi \Lambda / \lambda)(n_{co}^2 - n_{\textit{eff}}^2)^{1/2} \qquad (1)$$

Where $V_{\textit{eff}}$ is a dimensionless normalized parameter, $\lambda$ is the wavelength of the laser source, $\Lambda$ is the hole spacing including a factor d representing the hole size, $n_{co}$ is the index of refraction of the core of the PCF fiber. Chong and Rao noted that in order for effecting splicing, $V_{\textit{eff}}$ must be kept to 2.045 or lower by adjusting various factors including laser wavelength, hole size and hole spacing. It should be appreciated that Chong and Rao were concerned with the fusing of optical fibers without any appreciation for whether or how lasers could be controlled for use in cooking food.

Accordingly, a method and apparatus are disclosed herein for rapid and efficient heating or cooking of food products, such as commonly used domestic food materials, that can include a divergent laser beam that is expanded by a beam expander so as to irradiate a large food area with a given power level in an amount sufficient to effect fast, efficient and hygienic cooking of the food through the generation of a plasma in and around the food product which adds energy to the food product in an amount sufficient to effect cooking.

In an embodiment, a beam of electromagnetic radiation is a laser beam of sufficient controlled intensity, which need not necessarily be high intensity, to create a plasma effect during cooking. According to conventional wisdom and practices, light dissipation at the point of irradiation should result in erratic performance, distortion and/or higher attenuation. However, in connection with various embodiments, a laser operating at specified parameters can add energy in a cumulative fashion to achieve a plasma effect which, counter to conventional knowledge and expectation in the art, results in high energy absorption, resulting in an excellent ultrafast cooking, with low power consumption.

An exemplary apparatus or appliance in accordance with embodiments can be configured to suitably position food material in a container. An intense beam of electromagnetic radiation can be generated and irradiated onto the food material for a time sufficient to achieve the effective cooking of the food. An exemplary appliance can be further configured so that during cooking, the food material can be observed. A controller can be provided that is configured to control the cooking process.

In an embodiment, a computer controlled laser system using a laser, a positioning system and a CCD camera are used to obtain high quality cooked food and a high level of system performance. In another embodiment, a method and apparatus for indirect cooking by using laser to heat a plate and subsequent use of heated plated for cooking of food. In still another embodiment, a method and apparatus are provided for combination cooking like combining laser cooking with other methods, such as microwave and conventional heating. In still another embodiment, a field-usable microcontroller or personal computer controlled laser cooking appliance is provided to obtain high quality cooked food with speed and improved efficiency in field locations.

It should be noted that during the development of the invention as discussed and described herein, efforts were divided into roughly two areas. In the first area, extensive investigations were performed to determine characteristics of the laser cooking process and for carrying out process optimization. Investigation into the relationship between the quality of the cooked food was conducted in connection with the following process parameters: (i) average laser power and peak laser power; (ii) laser type, such as Nd:YAG, CO2, Excimer and diode lasers; (iii) laser operating wavelength; (iv) laser exposure time; (v) continuous/pulsed mode of operation; (vi) pulse width, pulse repetition rate duty cycle and the like.

Since the possible permutations/combinations of the above process parameters are innumerable, an analytical approach, careful planning and theoretical modeling were employed to determine the optimum parameters as precisely as possible. The physical effects of high power laser radiation on the food materials are modeled. Intense beams tend to modify the properties of the cooked food and this phenomenon has been exploited for laser cooking. Analytical calculations of the sample temperature under various conditions of irradiation and material response are performed. In connection with certain laser sources, such as diode lasers, the absorbed optical power by the food materials may be enhanced by the generation of laser induced plasma.

Investigations revealed that the generation of laser induced plasma, which occurs for certain lasers above a certain threshold power level, results in a significant increase in the absorption of the laser radiation by food materials. By using high peak power laser sources that are not necessarily large in size, by using short pulse durations, and by controlling other process parameters carefully, an excellent cooking process can be achieved. The cooked food items were evaluated by examining taste and appearance, and by studying structural details of the resulting cooked food product using high magnification microscopes for additional information.

The second area of investigation involved the development of a laser cooking appliance including a computer aided, field usable personal computer based laser cooking system having, for example, the following subsystems: (1) a food product positioning subsystem; (2) an imaging subsystem; (3) a laser emitter assembly; and (4) a laser emitter positioning subsystem. Development efforts further included system integration and software development efforts to apply and transform, for example, the findings from the first area and other information into usable parameters to control an exemplary appliance.

It should be noted that because of the different concepts and corresponding mechanisms used in connection with various embodiments, the laser emitter assembly and laser emitter positioning subsystem, can be easily distinguished from those found in the conventional cooking systems. The laser emitter assembly includes a laser source such as a compact laser source, a laser driver, a lens assembly and a delivery system. The laser emitter positioning subsystem enables the laser beam from the emitter to be directed in a controlled manner toward the food to be cooked. In accordance with various embodiments discussed and described herein, subsystems were specifically configured to advantageously reduce system weight, lower costs and improve process efficiency.

In accordance with various embodiments, the dependence of the resulting characteristics of food products cooked with a laser has been carefully studied in connection with various laser parameters such as power, wavelength, and continuous and pulsed mode of operation. In the pulsed mode of operation, cooked food quality and properties, both during the cooking process and at the end of the cooking process, were studied with various values for laser pulse width, pulse repetition rate, duty cycle and the like. A camera such as a charged coupled device (CCD) camera was used for viewing of the food material during the cooking process. The final cooked food products were tested for quality in terms of taste quality and experience, such as a consistency, and were studied using optical/electron microscopes to examine the structural details of the irradiated food. The results of the investigations and studies and the results of theoretical modeling provided a basis for deriving process optimization for various laser sources, foods and modes of operation. Accordingly, such efforts provided information regarding the effectiveness of a variety possible process parameters on variety of food items.

Using widely available laser sources, both direct and indirect cooking processes were carried out using the following lasers: a CO2 laser—$\lambda=10.6$ μm; a Nd:YAG laser—$\lambda=1.06$ μn; an Excimer laser—$\lambda=248$ nm; a He—Cd laser—$\lambda=385$ nm; and a diode Laser—$\lambda=820$ nm, 850 nm, and other wavelengths.

It should be noted that various kinds of food products were used in the investigations such as cereals including rice, vegetables, milk, and meat. Numerous samples were exposed under various operating parameters from each of the above laser sources.

CO2, Nd:YAG and Diode Lasers

CO2 laser has a typical energy conversion efficiency of 10%. An advantage of CO2 laser is high power, which results in high absorption. In contrast, when food items are irradiated with a Nd:YAG or a laser diode, a significant increase in absorption is observed, presumably because of the phenomenon of plasma generation within the bulk of the material above certain threshold power levels. In addition, laser diodes offer many potential benefits such as improved light emission efficiency, low voltage operation, electronic control compatibility, small size, and low weight.

Using CO2 laser, such as a Synrad Model 48-1-28 laser and a Coherent Diamond 84, 250 W laser, 500 food samples were exposed under various operating parameters from the laser, both in continuous and pulsed mode of operation. The objective of the initial experimental investigations was to identify ranges for various laser operating parameters suitable for cooking. The dependence on cooking time for various laser parameters was studied. The findings were used to determine parameters leading to the most favorable balance of speed of the cooking process, effectiveness or quality of the cooking result. In addition to direct laser cooking, investigations have also been conducted on the indirect laser cooking where food materials are cooked on a hot metal plate heated by laser.

The results of the above experimental studies indicate that for effective cooking results, the maximum laser power for cooking and the exposure time are closely interrelated. For example; an exemplary emitter having a laser power levels below 1 W has disadvantages because such an emitter either requires the food product to be subjected to an exposure time that is too long, or does not cause a level of heating sufficient to perform cooking. Similar effects are exhibited when using pulsed laser radiation of insufficient pulse duration. The above noted phenomenon indicates the additional relationship between maximum power, exposure time and pulse period.

The variation of food texture as well as food quality as a function of laser power and exposure time was investigated. With optimum cooking parameters, the quality of the cooked food is excellent. Similar investigations were carried out with Nd:YAG and diode lasers, however, for these lasers, no significant cooking of food is observed below certain threshold power. For a Nd:YAG laser, such a model M690B laser by NEC, the threshold power is closely related to the laser beam diameter. It will be appreciated by those of skill in the art that Nd:YAG lasers are typically optically pumped using a flashtube or laser diodes and are among the most common types of lasers, emitting light with a wavelength of 1064 nm. Other wavelengths are possible near 940, 1120, 1320, and 1440 nm. When operated in a pulsed or Q-switching mode, an optical switch in the laser cavity that is sensitive to neodymium ion activity can be used for pulsed mode operation. Pulse mode operation may be used to efficiently generate laser light at shorter wavelengths.

Cooking can be achieved at continuous power levels of 1 W-4 W. Cooking at lower power levels may be possible using a small beam diameter Nd:YAG laser. Using the above identified M690B laser with pulsed mode operation, good cooking can be achieved with the parameters set forth in Table 1.

TABLE 1

Cooking parameters with Model M690B Nd:YAG laser

| Peak Power | Average Power | Pulse Width | Pulse Repetition | Exposure |
|---|---|---|---|---|
| 0.3 kW | 1.9 W | 100 ns | 3 kHz | 60 s |
| 0.3 kW | 1 W | 50 ns | 3 kHz | 60 s |
| 0.3 kW | 1.6 W | 50 ns | 4 kHz | 60 s |

As mentioned above, diode lasers have many advantages and are used as the light emitting element in accordance with embodiments. Diode lasers operating at, for example, 820 nm (6 W), 850 nm (10 W) and 950 nm (10 W) have been successfully used for cooking of food items. With 3.5 W of continuous power at 850 nm and at 950 nm, food exposed for 1 minute exhibits good cooking quality results. Cooking can be achieved at higher power levels, such as levels greater than 3.5 W, and shorter exposure times. However, control of various aspects associated with the application of the laser energy at higher power levels is critical for achieving acceptable quality cooking results. It should be noted that laser diodes operate mainly in the continuous mode. However, for the purposes of the experiments described herein, general purpose laser diodes were operated in a pulsed mode with limited success. Alternatively, special purpose pulsed mode laser diodes can be used. It should also be noted that in connection with the experiments described herein, 820 nm, 850 nm, and 950 nm laser diodes were used due to wide availability and low cost. Longer wavelength laser diodes, which are becoming more readily available, may also be used. Such longer wavelength devices provide advantages and improvements for laser cooking purposes.

Thus, as described herein, the feasibility of laser cooking in accordance with embodiments described herein, especially concerning the use of diode lasers, and thus the possibility for successful implementation of a commercially viable laser cooking appliance, has been demonstrated despite being absent from the art. Theoretical modeling and simulation has also been carried out, which is essential for better understanding and optimization of the laser cooking process.

Figure 1A:
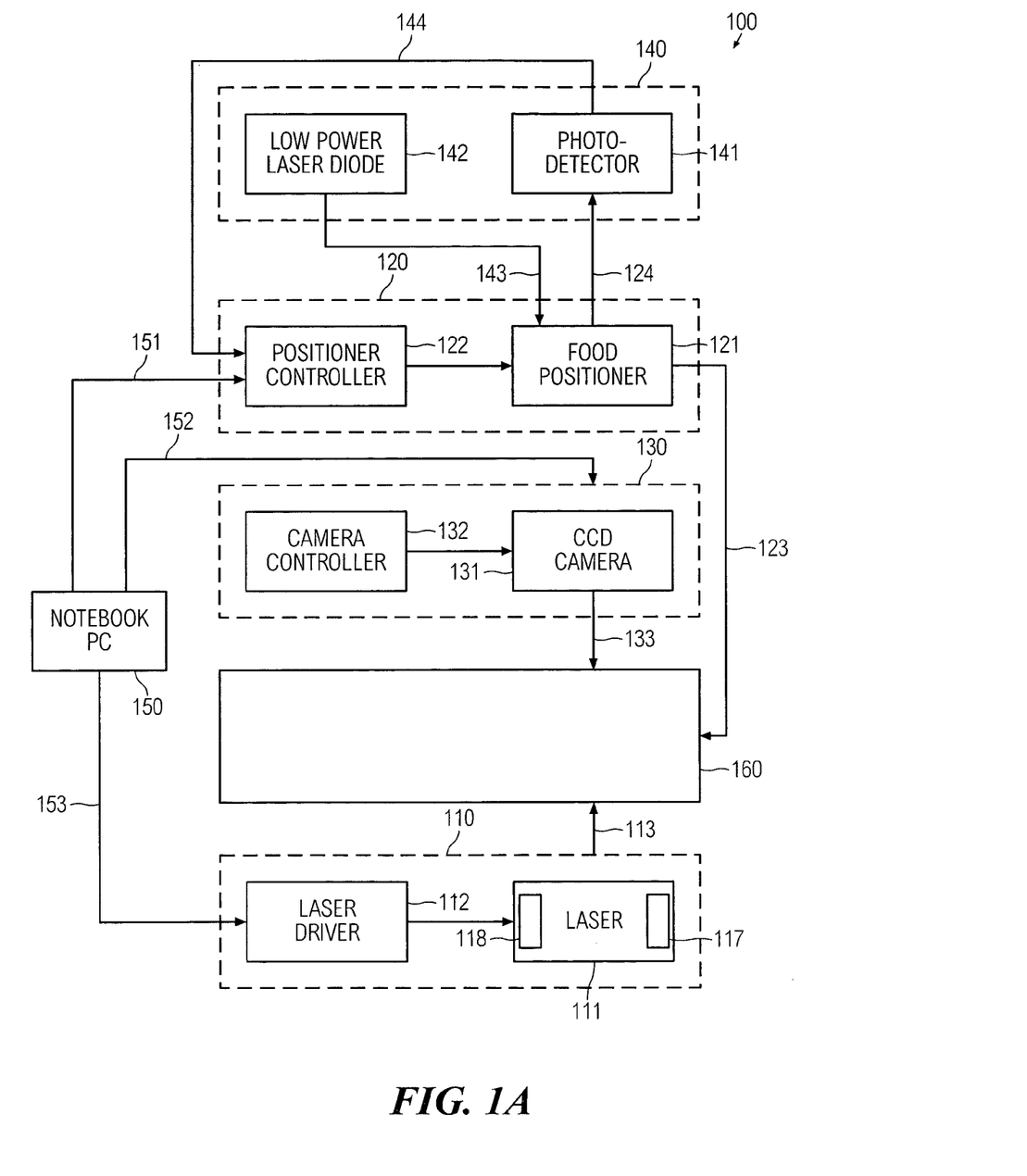
FIG. 1A is a block diagram illustrating an exemplary laser cooking system in accordance with embodiments.

With reference now to FIG. 1A of the drawings, and exemplary system 100 and associated subsystems are discussed and described. It will be appreciated that in accordance with embodiments, the system 100 can be situated in a stand alone enclosure, suitable for use as a movable kitchen appliance, or can be built into a cooking console or the like. The system 100 can be implemented in a wide variety of scenarios, such as but not limited to a private residence, workplace, or commercial food establishment such as a restaurant or the like.

A laser emitter assembly no can be provided and with a laser unit in and a driver unit 112 which can include alignment and focusing control and the like as would be appreciated. The laser unit 111 can include a single laser or multiple lasers and, correspondingly, the system 100 can be provided with one laser unit 111 or can be provided with a number of such units. Through the operation of the various subsystems including the laser unit 111, energy from the laser beam can be applied with given power levels and durations and the like, to a food product by directing the beam or beams accordingly.

The system 100 can include a food or indirect heating utensil placement base 160 that provides a predetermined placement area within which good alignment between the beam from laser unit 111 and a food product can be expected in order to enable optimum cooking. System 100 can further include an imaging subsystem 130, that enables the food product to be viewed through, for example, a monitor device such as a CCD camera 131 through a viewing access connection 133 during the cooking process. The CCD camera 131 can be controlled through a camera controller 132.

In order to control various aspects of the position of the food within the base unit 160, a food positioner 121 can be used. Control of the position of the food being cooked by setting or adjusting the food positioner 121 can be controlled by positioner controller 122. It will be appreciated that various aspects related to position of the food, including elevation within the base unit 160, and including dynamic position, such as rotation or the like, can be controlled in order to accomplish desired cooking results.

It will further be appreciated that various aspects related to in-progress cooking can be detected and used as feedback such as the intensity of the light output, the temperature of the cooking chamber and the like. Accordingly, a detection unit 140 can be provided that includes a photo detector unit 141 and a low power laser diode unit 142 for sensing certain aspects of the cooking process including pre-cooking, in-progress cooking, and post-cooking aspects.

It should be noted that the above noted subsystems can further be controlled by a host computer, such as Notebook PC 150. The CCD camera controller 132, for example, may be capable of being further controlled through Notebook PC 150 and connection 152, which can be a proprietary connection, a bus, a high speed connection port such as a universal serial bus (USB) port, wireless connection or the like. The notebook PC 150 can also be used to control parameters such as the position and the power of the laser unit iii by interfacing with laser controller 112 through another connection 153, which can be a proprietary connection, a bus, a high speed connection port such as a universal serial bus (USB) port, a wireless connection or the like. Still further, the notebook PC 150 can be used to control the position of the food within the base unit 160 by interfacing with position controller 122 through connection 151, which can be a proprietary connection, a bus, a high speed connection port such as a universal serial bus (USB) port, wireless connection or the like.

It should be noted that various hardware and software interfaces can be used in connection with a microcontroller or a PC based system, such as Notebook PC 150, to interface all the subsystems so as to provide control of the operations as noted above.

Although it will be appreciated that the Notebook PC 150 can provide a convenience platform for development, a desktop PC, a general purpose microcontroller based system, or a dedicated microcontroller based system can be used. Any such controller or computer should be provided with a facility to connect and operate through a PC if desired by the user. As noted above, in accordance with embodiments, a personal computer can be interfaced with a positioning subsystem to allow good positioning of the food during cooking. The power output of the laser emitter assembly and mode of operation of the laser can be used to control the power of the laser during the cooking process and can be controlled by the computer. The laser emitter assembly no can includes the laser driver 112, a laser source in, and a lens assembly and delivery system 117. A laser gun alignment system 118 enables the laser beam from the laser source 111 to be aligned so as to fall precisely on the food to be cooked. Additional control inputs can be used to control the laser with a particular power, mode of operation, and, for example, beam focus or the like using the components illustrated as would be appreciated.

Using the imaging subsystem, a real-time image of the food is captured and displayed on the PC monitor and can be used for feedback and quality monitoring. The various subsystems were tested and further fine-tuning can be done if necessary. It will be appreciated that the above computer control can be taken a step further by developing control applications that can determine for a particular kind of food, what the optimum control parameters are, then implement those parameters. In still other embodiments, the computer can be connected to a network and thereby may retrieve various information such as cooking profiles or the like for specific food products that may then be used in connection with control of the apparatus.

Figure 1B:
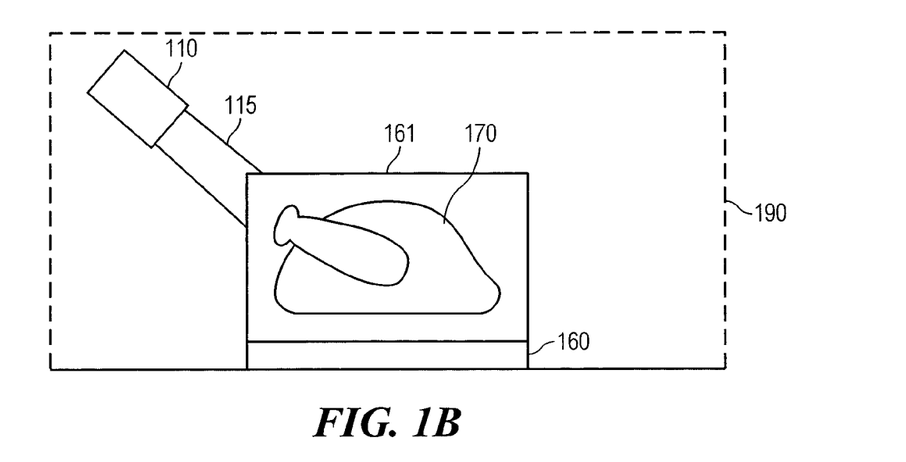
FIG. 1B is a diagram illustrating a laser cooking system having a food product in a container in accordance with an exemplary embodiment.
Figure 1C:
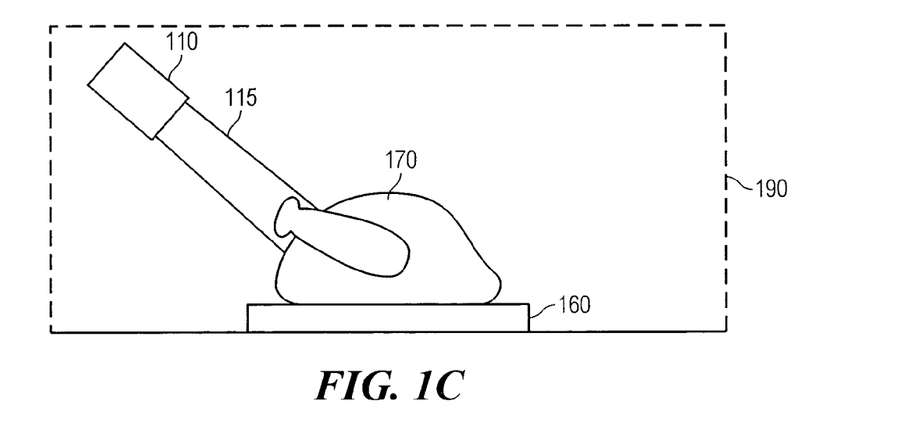
FIG. 1C is a diagram illustrating a laser cooking system having a food product without a container in accordance with another exemplary embodiment.

To better understand various configurations that are possible in accordance with embodiments, reference is made herein to FIG. 1B-1G. While the general relative configuration of for example the laser emitter 110, laser beam 115, platform 160 and food product 170, within, for example, enclosure 190, various details have been omitted for the sake of simplicity. With reference to FIG. 1B, embodiments may include laser emitter 110 emitting a laser beam 115 that impinges on a container 161 into which food product 170 is placed. Container 161 can be, for example, a container of a material or with a surface treatment to effect a heating based on a constant profile. In such a manner, there is negligible reliance on the absorptive properties associated with the type of food product, e.g. the material of the container interacts with the laser beam 115 in order for a plasma to be generated and for heating to occur. In connection with FIG. 1C and associated embodiments, a food product 170 may be placed within an enclosure 190 and irradiated directly with a laser beam 115, whereupon heating may occur as described in greater detail hereinafter.

Figure 1D:
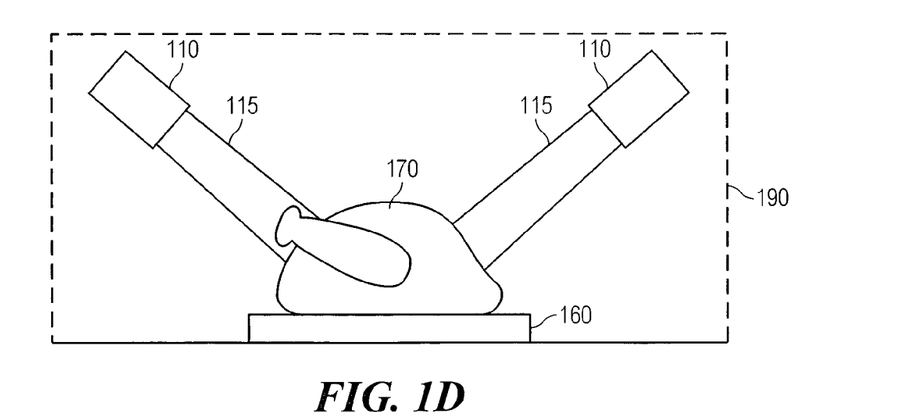
FIG. 1D is a diagram illustrating a laser cooking system having more than one laser emitter in accordance with another exemplary embodiment.
Figure 1E:
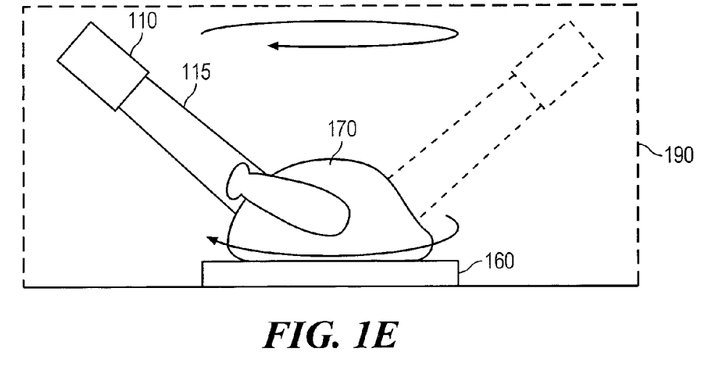
FIG. 1E is a diagram illustrating a laser cooking system showing a rotating emitter and showing a rotating platform in accordance with exemplary embodiments.
Figure 1F:
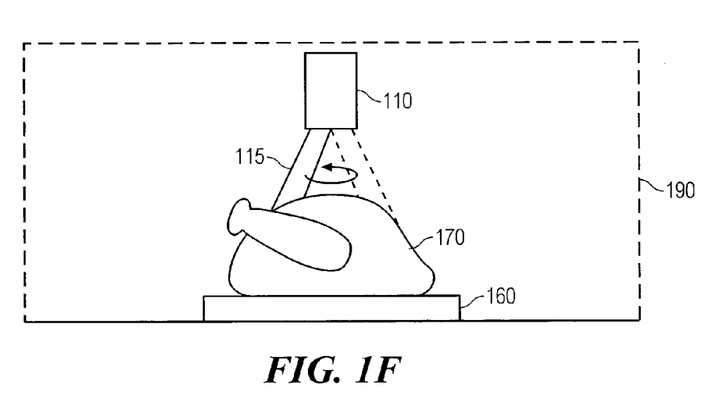
FIG. 1F is a diagram illustrating a laser cooking system having a rotating beam in accordance with another exemplary embodiment.

In connection with FIG. 1D and associated embodiments, two, or possibly more emitters, such as emitter 110 and emitter no' can generate laser beams 115 and 115', which can fall upon food product 170 resulting in heating and effect cooking as described herein. FIG. 1E is illustrative of embodiments where an emitter 110 can be configured to rotate. Alternatively, or in connection with a rotating emitter no, the platform 160 can also be configured to rotate. It will be appreciated that by rotating one or more of the emitter 110 and platform 160, the energy from the laser beam 115 can be more evenly distributed over the surface of the food product 170. In one or more embodiments, as shown in FIG. 1F, the laser emitter unit itself can be stationary and the beam 115 itself can be directed through a beam alignment mechanism to rotate or to move in any specified pattern such as a lissajous pattern or the like as would be appreciated by one of skill in the art to effect coverage of an area larger than the spot size of beam 115.

Figure 1G:
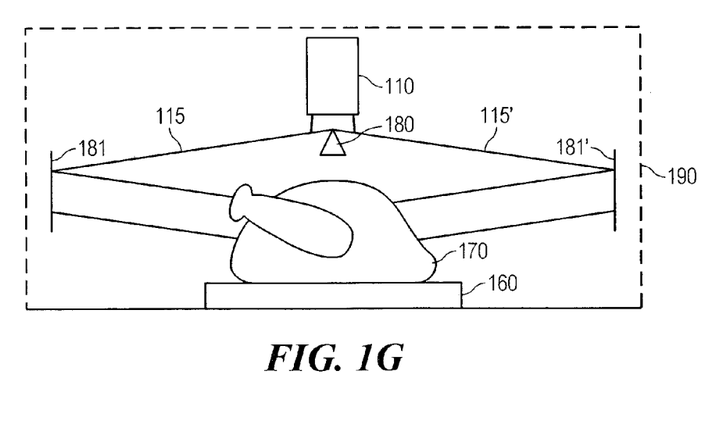
FIG. 1G is a diagram illustrating a laser cooking system having a split beam in accordance with another exemplary embodiment.

In connection with still other exemplary and alternative exemplary embodiments, as shown in FIG. 1G, the beam 115 can be split into a beam 115 and beam 115' with a splitting mechanism 180 that can produce enhanced coverage of the food product 170. The laser energy can be reflected, for example, off of surfaces such as mirrors 181 and 181' or the like, or the inside of enclosure 190 can be configured to reflect the energy from laser beam 115. In some embodiments, it may be possible to incorporate splitting mechanism 180 into the surface of the enclosure 190 such that the beam need only be directed toward a specific portion of the inside surface of the enclosure 190 in order to effect splitting.

Figure 2:
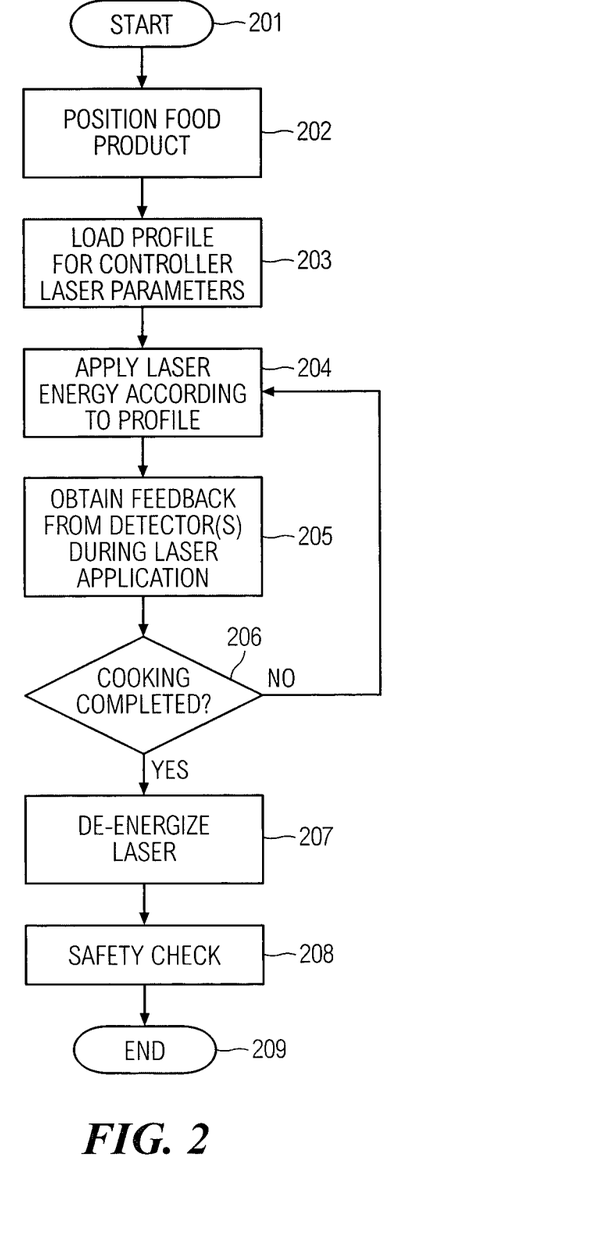
FIG. 2 is a flow chart illustrating an exemplary process for cooking a food product with a laser cooking system in accordance with embodiments.

It will be appreciated that the above mechanisms or other mechanisms can be adapted to practice a method for cooking using a laser as will be described hereinafter in connection with FIG. 2. An exemplary process 200 can be drawn to cooking of food according to exemplary sub-processes or procedures. After start at 201, which can include initial actions such as plugging into a power source, turning on a power switch, or the like, that can cause operative circuits including controller circuits to be energized, a food product can be positioned, for example, inside an enclosure, such as enclosure 190 described above, at 202. It will be appreciated that at start at 201, if necessary, connections to a network or the like and navigation to an appropriate URL can also be conducted in connection with start up or initialization procedures as would be appreciated by one of skill in the art. Prior to energizing the laser emitter, profile for controlling the laser parameters for cooking the food product, which can include specific parameters for a specific food product, general parameters for general cooking or heating, or fixed parameters for cooking using an in-enclosure container as described above, can be loaded at 203. Once the laser parameters are loaded and subject to an ordinary action such as pressing a start button, or the like, which action can also be conditioned by various safety related interlocks as would be appreciated, the laser emitter can be energized and laser energy in the form of a beam can be applied to the food product in accordance with the loaded profile at 204 that is set so as to generate a plasma in and around the food product. While the laser energy is being applied, various feedback can be generated and detected including but not limited to temperature, light level, infrared level, wavelength, or any other such parameter capable of being generated by the interaction of the laser beam with the food product or a contained surrounding the food product at 205. The feedback can be used in connection with the profile parameters to sustain the plasma generation, and to confirm that cooking or at least application of energy in association with the parameters, is being conducted as expected. Either through the feedback, or through open loop control, a point can be reached whereupon the cooking is deemed to be completed. If the cooking is not completed, corresponding to a NO at 206, then laser energy can continue to be applied at 204. If the cooking is completed, corresponding to a YES at 206, then the laser emitter can be de-energized and the application of laser energy can be ceased at 207. It will be appreciated that optionally, before the process can be completed, and, for example, an access door to the cooking enclosure be opened, certain safety procedures can be instituted such as a check to determine whether the laser has been properly de-energized and there are no fire or smoke hazards or the like that would prevent access to the cooked food product at 208. It will also be appreciate that during the application of energy, other mechanisms can be used to determine a fault condition such as the sensing of excess temperature, the sensing of excess current to the emitter driver or the like as would be appreciated. After, the optional safety check, which is not essential for appreciating the aspects of plasma generation, the process can come to an end at 209. In this context, ending can simply mean that an exemplary apparatus is configured to be ready for the next cooking cycle or can mean that power has been removed. In either case or in other cases, the process can begin again, upon re-energization or by re-starting operation as would be appreciated.

Figure 3:
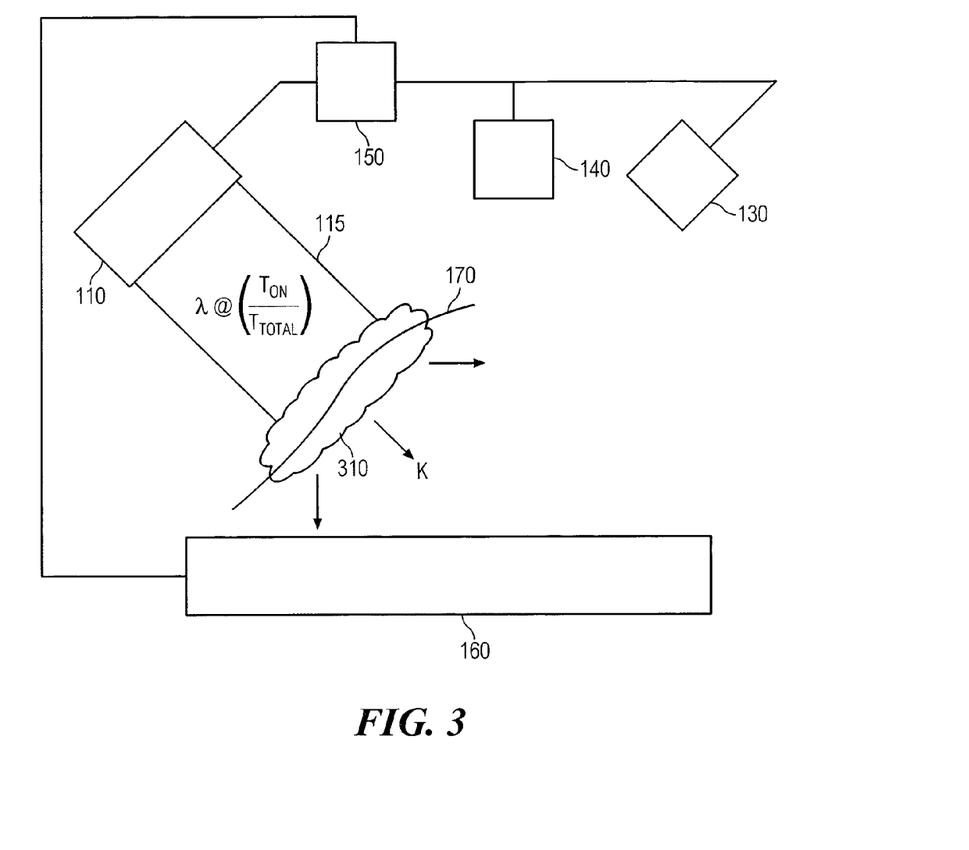
FIG. 3 is a diagram illustrating exemplary plasma generation for cooking a food product with a laser cooking system in accordance with embodiments.

To better understand plasma generation, FIG. 3 shows an exemplary laser 115 impinging on the surface of a food product 170. The laser beam 115 can have a wavelength λ and a duty cycle shown in the figure as a factor of the pulse time or on time of the laser $T_{ON}$ divided by the $T_{TOTAL}$ which can be expressed as a duty cycle percentage and can depend also on the frequency or duty period. In the above examples, such as those shown in Table 1, a duty frequency is set forth in units of KHz. However it will be appreciated that depending on factors such as the laser wavelengths and power levels, other frequencies may be used with effectiveness.

Accordingly, the laser energy can be applied through beam 115 to the surface of the food product 170, which can be resting on the platform 160. Through feedback such as feedback obtained through imaging subsystem 130 and detection subsystem 140, or other feedback means, or through open loop control with no feedback, laser power can be applied through the laser emitter 110, such as by controlling the laser driver 112, so as to effect a plasma 310 that can develop in and around the surface on which the laser is impinging. By controlling the application of the laser to generate and maintain the plasma 310, absorption of the energy from laser 115 into the food product 170 can be enhanced and cooking can be effected by the continued and cumulative absorption of energy from the generated plasma. It can be appreciated that, because of the generation of resonance and harmonics associated with the plasma generation, cumulative energy effects can be realized that facilitate the rapid cooking of the food as has been previously unappreciated in the art.

While exemplary embodiments pertaining to the invention are described and illustrated herein, it will be understood by those skilled in the technology concerned that many variations or modifications involving particular design, implementation or construction are possible and may be made without deviating from the inventive concepts as set forth herein.

The invention claimed is:
1. A method for applying energy to a positioned food product to effect cooking thereof, the method comprising:
applying laser energy from a laser emitter onto the food product;

controlling the application of the laser energy from the laser emitter onto the food product according to a profile; and generating laser-induced plasma in and around at least a portion of the food product by the controlled application of the laser energy onto the food product, wherein the laser-induced plasma distributes the energy from the laser emitter within the food product so as to effect the cooking of the food product during a cooking period based on the controlling.

2. The method according to claim 1, further comprising adjusting the application of the energy from the laser emitter during the cooking period based on feedback associated with the controlled application of the energy to the food product.

3. The method according to claim 1, wherein the profile includes a power level, a duration of the cooking period, and a pulse duty cycle.

4. The method according to claim 1, wherein the controlling the application of the energy includes controlling a spot size of the laser beam.

5. The method according to claim 1, wherein the adjusting the application of the energy includes controlling a position of the food product in relation to the laser emitter.

6. The method according to claim 1, wherein the laser emitter includes an Nd:YAG laser.

7. The method according to claim 1 wherein the laser emitter includes a $CO_2$ laser.

8. The method according to claim 1, wherein the laser emitter includes an Excimer laser.

9. The method according to claim 1, wherein the laser emitter includes a diode laser.

10. The method according to claim 1, wherein the profile includes a peak power of about 0.3 kW, an average power of about 1.9 W, a pulse width of about 100 ns, a pulse frequency of about 3 kHz, and a duration of the cooking period of about 60 s.

11. The method according to claim 1, wherein the laser emitter includes a laser diode and the profile includes a peak power of about 0.3 kW, an average power of about 1 W, a pulse width of about 50 ns, a pulse frequency of about 3 kHz, and a duration of the cooking period of about 60 s.

12. The method according to claim 1, wherein the laser emitter includes a laser diode and the profile includes a peak power of about 0.3 kW, an average power of about 1.6 W, a pulse width of about 50 ns, a pulse frequency of about 4 kHz, and a duration of the cooking period of about 60 s.

13. The method according to claim 1, wherein the application of energy during the cooking period is further based on a specific type of the food product.

14. The method according to claim 1, further comprising: retrieving the profile from a host computer.

15. The method according to claim 1, further comprising:
retrieving the profile from a host computer and a server connected to the host computer through a network.

16. A method for applying energy to effect cooking of a positioned food product, the method comprising:
applying laser energy from a laser emitter onto the food product;
controlling the application of the laser energy from the laser emitter according to a profile; and
generating laser-induced plasma in proximity to the food product during a cooking period based on the controlling.

17. The method according to claim 16, further comprising adjusting the application of the energy from the laser emitter during the cooking period based on feedback associated with the controlled application of the energy to the food product.

18. The method according to claim 16, wherein the food product is positioned within a container, the laser energy applied to at least a portion of the container to generate a plasma in and around the container in proximity to the food product to effect the cooking of the food product.

* * * * *